United States Patent [19]

Bevill et al.

[11] Patent Number: 4,889,097
[45] Date of Patent: Dec. 26, 1989

[54] ELECTRONIC FUEL CONTROL DEVICE AND METHOD

[75] Inventors: Fred Bevill, Rt. 4, Box 235, Denison, Tex. 75020; Theodore P. Kaufman, Richardson, Tex.

[73] Assignee: Fred Bevill, Denison, Tex.

[21] Appl. No.: 162,197

[22] Filed: Feb. 29, 1988

[51] Int. Cl.$^4$ .................. F02D 41/02; F02P 15/00
[52] U.S. Cl. .................. 123/478; 123/479; 123/640
[58] Field of Search .................. 123/479, 478, 640; 73/117, 117.3; 364/431.11, 431.05

[56] References Cited

U.S. PATENT DOCUMENTS

| | | | |
|---|---|---|---|
| 3,834,361 | 9/1974 | Keely | 123/479 |
| 4,207,851 | 6/1980 | Crisefi | 123/640 |
| 4,414,949 | 11/1983 | Honig et al. | 123/479 |
| 4,577,605 | 3/1986 | Arnold et al. | 123/479 |
| 4,748,566 | 5/1988 | Sasaki et al. | 123/479 X |

OTHER PUBLICATIONS

Intelligent Controls, Inc. advertisement, Automotive Engineering, Jul. 1988, p. 132; Oct. 1987, p. 82.

*Primary Examiner*—Tony M. Argenbright
*Attorney, Agent, or Firm*—Harry C. Post, III

[57] ABSTRACT

An electronic fuel control device is used to activate a fuel system carried on board a motor vehicle independently of a computer system carried on board the vehicle. The fuel control device embodies an electrical circuit to create an output of a series of pulses of electrical energy. Electrical power is carried to the electrical circuit by electrical supply conducting apparatus. The pulses of electrical energy are transported from the electrical circuit to the fuel injecting system by electrical pulse conducting apparatus connected to the fuel injecting system.

19 Claims, 2 Drawing Sheets

ELECTRONIC FUEL CONTROL DEVICE AND METHOD

It is well known that motor vehicles, specifically automobiles, presently use a computer system carried on board the vehicle to control the operations of the engine.

Further, it is well known that mechanics use electronic diagnostic equipment to assist them in locating parts, systems and equipment needing repair.

A problem arises, however, when an engine does not run because the diagnostic equipment will not function when the engine does not run.

Since the mechanic must run the engine to operate the diagnostic equipment, the mechanic begins replacing existing parts of the engine with new parts and attempting to start the engine. Should the engine start and continue running for a sufficient period of time, the diagnostic equipment is used to locate the malfunctioning parts, systems and equipment. Unless the mechanic immediately guesses the part, system and equipment needing repair, a large number of replacement parts are used and a substantial amount of time is used to find the malfunctioning part, system and equipment. Because the amount of time for completing the job is important to the mechanic, the mechanic will not normally go back through the repair work and replace those parts, systems and equipment that did not need repairing.

It has been discovered that the computer system carried on board the vehicle prevents the flow of fuel when the engine stops running or when the computer fails to operate correctly. Thus, this waste of time and parts, systems and equipment may be prevented by employing a device used for activating the fuel injecting system on board the vehicle independently of the computer system on board the vehicle.

Accordingly, it is an object of the present invention to provide an electronic fuel control device adapted to activate a fuel system on board a motor vehicle independently of a computer system carried on board the vehicle so that fuel is provided to the engine independently of the on board computer system.

Further, it is an object of the present invention to provide a method of controlling the fuel flow into an engine carried on board a motor vehicle independently of a computer system carried on board the vehicle.

In accordance with the present invention, an electronic fuel control device is adapted to activate a fuel injecting system carried on board a motor vehicle independently of a computer system carried on board the vehicle. The fuel control device comprises an electrical circuit to provide an output of a series of pulses of electrical energy. Electrical power is transported to the electrical circuit by electrical supply conducting apparatus. The pulses of electrical energy are transported from the electrical circuit to the fuel injecting system by electrical pulse conducting apparatus.

Further, in accordance with the present invention, a method is used to activate the flow of fuel to an engine carried on board a motor vehicle independently of a computer system carried on board the vehicle. Such method comprises supplying electrical power to an electrical system provided in the vehicle. A device adapted to provide an output of a series of pulses of electrical energy is connected to the electrical system of the vehicle. The output of pulses of electrical energy is transported from the device to a fuel injecting system provided on the engine, which activates the fuel injecting system to supply fuel to the engine for operation.

Other objects and advantages of the invention will become apparent upon reading the following detailed description and upon reference to the drawings, wherein like reference characters are used throughout to designate like parts:

Figure 1:
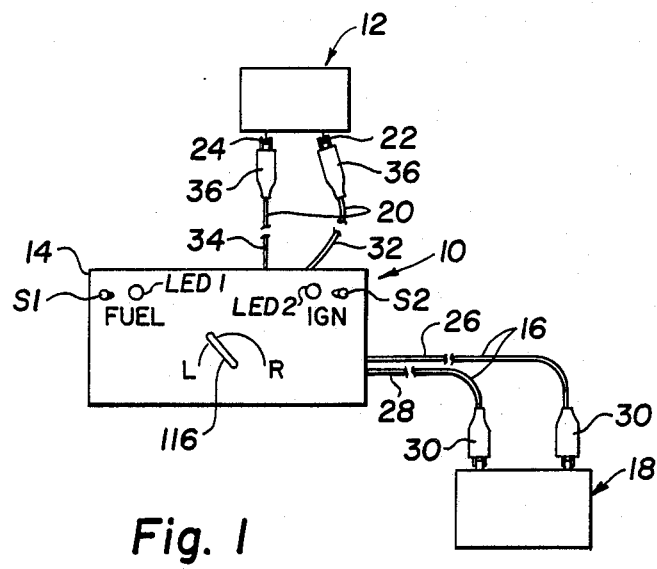
FIG. 1 is an elevational view of an electronic fuel control device constructed according to the present invention.
Figure 2:
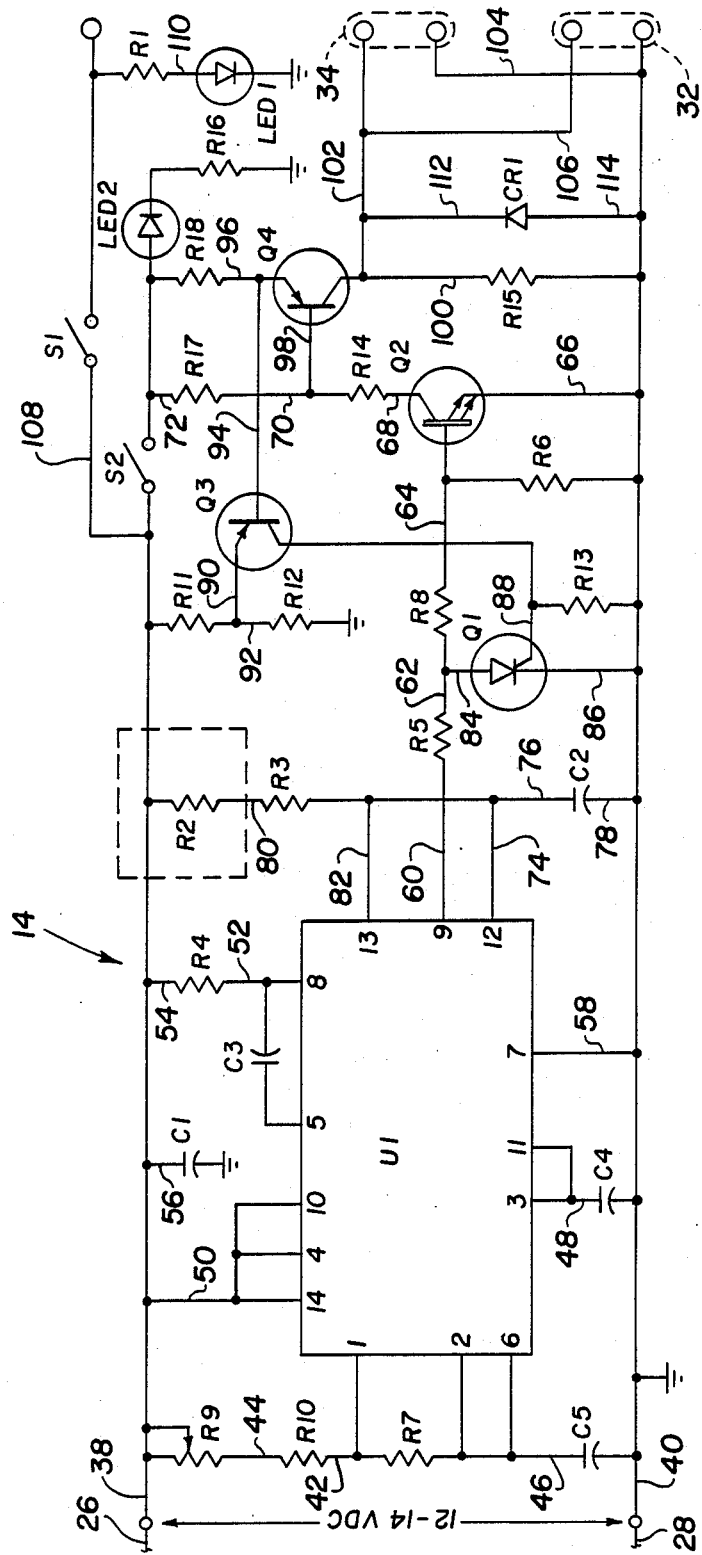
FIG. 2 is a schematic representation of the electrical circuitry used within the device illustrated in FIG. 1.

As best seen in FIGS. 1 and 2, an electronic fuel control device 10 is used to control a fuel injecting system 12 of a motor vehicle, preferably an automobile, independently of a computer system (not shown) carried on board the vehicle. An electrical circuit 14 is provided in device 10 to create an output of a series of pulses of electrical energy. Electric conducting apparatus 16 is connected to electrical circuit 14 to carry electrical power from an electrical system 18 used in the vehicle into electrical circuit 14. The pulses of electrical energy are transported from electrical circuit 14 to fuel injecting system 12 by electrical pulse conducting apparatus 20 to fuel injecting system 12.

Fuel injecting system 12 is of conventional design and has, in the case of a two cylinder engine, one terminal 22 on a fuel injector and, in the case of a four or six cylinder engine, terminals 22 and 24 on two fuel injectors.

Electrical system 18 is of conventional design and is, preferably, a twelve volt system using a conventional twelve volt storage battery.

Electrical energy is supplied to electrical circuit 14 by used of electric conducting apparatus 16. Electric conducting apparatus 16 includes conductors 26 and 28, which are detachably connected to electrical system 18 by convention devices 30, such as alligator clips.

The pulses of electrical energy are transported from electrical circuit 14 to fuel injecting system 12 by conductor 32 to terminal 22 of a solenoid on a fuel injector and by conductor 34 to terminal 24 of a solenoid on a second fuel injector. Conductors 32 and 34 are detachably connected to the respective terminal by use of conventional devices 36, such as alligator clips.

The electrical energy is carried from conductors 26 and 28 into electrical system 18 through conductors 38 and 40, respectively, provided on a printed circuit board.

Electrical circuit 14 creates an output of electrical energy having a series of pulses of constant duration. An integrated circuit U1, such as that sold by Signetics under number NE556, is used to establish the timing of circuit 14. Circuit U1 contains two timing sections, the first section being used to generate a sequence of variably spaced pulses and the second section being used to control the duration of each pulse. integrated circuit U1 has connecting pins 1–14.

Pin 1 is joined to a conductor 42, which interconnects a resistor R10 (a 11K ohm resistance, such as that sold by RCR07 with number ¼ W 10%) and a resistor R7 (a 56K ohm resistance, such as that sold by RCR07 with number ¼ W 10%). A conductor 44 connects resistor R10 to a potentiometer R9 (a 1M ohm maximum resistance, such as that sold by Allen-Bradley with number 73U4G032R105U), which is connected to conductor 38. A conductor 46 connects resistor R7 to a plate of capacitor C5 (0.1 UFD capacitance, such as that sold by Nichicon with number QYA2A104KTP), with the other plate being connected to conductor 40, which runs to ground.

Pins 2 and 6 are joined to conductor 46 at a locations between resistor R7 and capacitor C5. The location of the junction of pin 2 with conductor 46 is nearer resistor R7 than the location of the junction of pin 6 with conductor 46.

Pins 3 and 11 are joined to a conductor 48, which is connected to a plate of capacitor C4 (a 0.1 UFD capacitance, such as that sold by Nichicon with number QYA-2A104KTP) with the other plate being connected to conductor 40.

Pins 4, 10 and 14 are joined to a conductor 50, which is connected to conductor 38.

Pin 5 is joined to a plate of capacitor C3 (a 0.01 UFD capacitance, such as that sold by Nichicon with number QYA2A103KTP) with the other plate being connected to a conductor 52, which connects pin 8 to resistor R4 (a 11K ohm resistance, such as that sold by RCR07 with number $\frac{1}{4}$ W 10%). Resistor R4 is connected to conductor 38 by a conductor 54. A conductor 56 joins one plate of a capacitor C1 (a 6.8 UFD capacitance, such as that sold by Nichicon with number 1H6R8MAA) to conductor 38 between the junction of conductors 50 and 54 with conductor 38 with the other plate running to ground.

Pin 7 is joined to conductor 40 by a conductor 58.

Pin 9 is joined to one side of a resistor R5 (a 220 ohm resistance, such as that sold by RCR07 with number $\frac{1}{4}$ W 10%) by a conductor 60 and the other side of resistor R5 is joined to one side of a resistor R8 (a 330 ohm resistance, such as that sold by RCR07 with number $\frac{1}{4}$ W 10%) by a conductor 62. The other side of resistor R8 is connected to the base of a transistor Q2 (such as that sold by Texas Instruments with number TIP110) by a conductor 64. The emitter from the base of transistor Q2 is connected by conductor 66 to conductor 40 and the collector of transistor Q2 is connected by conductor 68, which is connected to one end of resistor R14 (an 18 ohm resistance, such as that sold by RCR07 with number 1 W 10%). The other end of resistor R14 is connected to a conductor 70 that runs to one end of resistor R17 (a 100 ohm resistance, such as that sold by RCR07 with number $\frac{1}{4}$ W 10%), the other end of resistor R17 being connected to conductor 38 by conductor 72.

Figure 3:
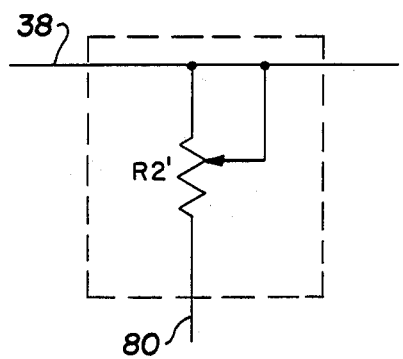
FIG. 3 is a schematic representation of a portion of the electrical circuitry illustrated in FIG. 2.

Pin 12 is joined by conductor 74 to a conductor 76, which interconnects a plate of capacitor C2 (a 0.01 UFD capacitance, such as that sold by Nichicon with number QYA2A103KTP) and one end of a resistor R3 (a 68K ohm resistance, such as that sold RCR07 with number $\frac{1}{4}$ W 10%). The other plate of C2 is connected by conductor 78 to conductor 40. The other end of resistor R3 is connected by conductor 80 to one end of a resistor R2, the other end of resistor R2 being connected to conductor 38. It is preferred that resistor R2 is fixed, as shown in FIG. 2, having a 100K ohm resistance, such as that sold by RCR07 with number $\frac{1}{4}$ W 10%. However, as shown in FIG.3, fixed resistor R2 may be replaced with a potentiometer R2 (a 100K ohm maximum resistance, such as that sold by Bourne under the number 3359P-1-104).

Pin 13 is joined by a conductor 82 to conductor 76 nearer to resistor R3 than the junction of conductor 74 with conductor 76.

A SCR Q1 (such as that sold by Motorola with the number 2N5060) is connected by a conductor 84 to conductor 62, by a conductor 86 from the base to conductor 40 and by a conductor 88 to the collector of a transistor Q3 (such as that sold by Texas Instruments with number 2N2907). The emitter of transistor Q3 is joined by a conductor 90 to another conductor 92. Conductor 92 is joined to one end of resistor R12 (a 3300 ohm resistance, such as that sold by RCR07 with the number $\frac{1}{4}$ W 10%), the other end of resistor R12 runs to ground, and to one end of resistor R11 (a 100 ohm resistance, such as that sold by RCR0y with number $\frac{1}{4}$ W 10%), the other end of resistor R11 being joined to conductor 38. The base of transistor Q3 is connected by a conductor 94 to another conductor 96. Conductor 96 is connected to one end of a resistor R18 (a 0.2 ohm resistance, such as that sold by Dale with the number 5W CW2B-0.2), the other end of resistor R18 being joined to conductor 38, and to the emitter of a transistor Q4 (such as that sold by Motorola with the number TIP2955). The base of transistor Q4 is connected by a conductor 98 to conductor 70 and the collector of transistor Q4 is connected by a conductor 100 to one end of a resistor R15 (a 560 ohm resistance, such as that sold by RCR07 with number $\frac{1}{4}$ W 10%), the other end of resistor R15 being joined to conductor 40.

Conductor 34 is formed by a first conductor 102 that is joined to conductor 100 at a location between transistor Q4 and runs into and a second conductor 104 that is joined to conductor 40.

Conductor 32 is formed by conductor 40 and a second conductor 106 that is jointed to conductor 102.

To selectively provide the pulses of electrical energy to conductors 32 and 34, a single pole, single throw switch S2 (such as that sold by ALCO under the number MTA-106D) is connected within conductor 38 between the junctions of conductor 72 with conductor 38 and of resistor R11 with conductor 38.

To provide a visible indication of when electrical energy is provided to conductors 32 andn 34, a red light emitting diode LED2 (such as that sold by Radion under the number LD-R1R-50-1) is connected to conductor 38 between the junctions with resistor R18 and resistor R16 (a 560 ohm resistance, such as that sold by RCR07 with the number $\frac{1}{4}$ W 10%), which runs to ground.

To selectively provide electrical power to an ignition circuit of the computer system carried on board the vehicle, a single pole, single throw switch S2 (such as that sold by ALCO under the number MTA-106D) is connected to a conductor 108, which is connected to conductor 38 at a location between the junction of resistor R11 with conductor 38 and switch S2.

A diode CR1 (such as that sold by International Rectifier with the number 1N4W01) is connected by conductor 112 to conductor 102 and by conductor 114 to conductor 40. Diode CR1 prevents damage to circuit 14 by preventing an electrical output with a reverse polarity.

To provide a visible indication of when electrical power is provided to the ignition circuit, a red light emitting diode LED1 (such as that sold by Radion under the number LD-R1R-50-1) is connected to a conductor 110, which is joined through a resistor R1 (a 560 ohm resistance, such as that sold by RCR07 with the number $\frac{1}{4}$ W 10%) to conductor 108.

The first timing section from integrated circuit U1 (pins 1, 2, 5 and 6) is used to generate the sequence of variably spaced pulses. The number of pulses produced per second is determined by the following equation:

$$\text{Pulse Rate} = \frac{1.49}{(R9 + R10 + 2 * R7) * C5}$$

The number of pulses of energy carried through conductors 32 and 34 is varied by varying the resistance in potentiometer R9. The resistance in potentiometer R9 is varied by moving arm 116 (best seen in FIG. 1), which is connected to the wiper of potentiometer R9.

Capacitor C3 couples the variably spaced pulses from the first timing section of integrated circuit U1 to the input (pin 8) of the second timing section, which determines the duration of each output pulse. The duration of each output pulse is determined by the following equation:

$$\text{Pulse Duration} = 1.1 * C2 * (R2+R3)$$

The output from the second timing section (pin 9) is coupled through resistors R5 and R8 to the base of Q2. The electrical pulses at this point are incapable of supplying the current required to drive the solenoids provided on the fuel injectors of the fuel injecting system. Transistors Q2 and Q4 retain the precise duration and spacing times established by integrated circuit U1, but amplify the signals sufficiently to drive the desired solenoids.

Resistor R18 causes a voltage protential to be developed that is proportional to the current being supplied to the solenoids (or other external load). If excessive output current is drawn, the potential developed across R18 will exceed the potential set by the divider combination of R11 and R12. This will cause transistor Q3 to conduct, which further causes transistor Q1 to conduct. When Q1 conducts, it presents a low impedance from the junction of R5 and R8 to ground. The output pulse from integrated-circuit U1 is now dissipated across R5 and insufficient drive current is provided to Q2 and Q4 to produce and output.

Since Transistor Q1 is a silicon controlled rectifier, once it starts to conduct it becomes independent of the signal from Q3 and will extinguish only when its anode current drops below some minimum level. Anode current will continue to flow through R5 to pin 9 of integrated circuit U1 for the pulse duration. At the end of the pulse, the potential at pin 9 drops to a level that will not sustain conduction of Q1 and it will extinguish. The circuit will thus monitor the output current drain during each output pulse and if an overload is detected, shuts itself off for the duration of that pulse. At the end of each pulse it automatically resets itself.

The fuel flow to an engine carried on board a motor vehicle is controlled independently of a computer system carried on board the vehicle. Apparatus 14 adapted to create an output of a series of pulses of electrical energy is connected to the electrical system of the vehicle by conductors 32 and 34. Electrical power is supplied to apparatus 14. The output of pulses of electrical energy are directed from the device to a fuel injecting system carried on board the vehicle and thereby activate the fuel injecting system to supply fuel to the engine for operation. Apparatus 14 is controlled so that the series of pulses may be of constant duration and in a sequence of variably spaced pulses such that the flow of fuel is controlled to selectively vary the ratio of fuel to air for use in the engine. The pulses of electrical energy may be selectively provided by switch S2 to the fuel injecting system and a visible indication of when electrical energy is provided to the fuel injecting system is provided. Electrical power is selectively provided by switch S1 to the ignition circuit in the computer system and a visible indication of when electrical power is provided to the ignition circuit of the computer system is provided.

The invention having been described, what is claimed is:

1. An electronic fuel control device adapted to activate a fuel injecting system carried on board a motor vehicle independently of a computer system carried on board the vehicle, comprising: electrical circuit means for creating an output of a series of pulses of electrical energy; electrical supply means connected to said electrical circuit means for carrying electrical power into said electrical circuit means; and pulse conducting means connected to said electrical circuit means for transporting the pulses of electrical energy from said electrical circuit means to the fuel injecting system.

2. An electronic fuel control device as set forth in claim 1, further comprising: said electrical circuit means including means for creating constant duration pulses of electrical energy.

3. An electronic fuel control device as set forth in claim 2, further comprising: said electrical circuit means including means for creating a sequence of variably spaced pulses such that the flow of fuel is controlled to selectively vary the ratio of fuel to air for use in an engine carried on board the vehicle.

4. An electronic fuel control device as set forth in claim 3, further comprising: said electrical circuit means including an integrated circuit having first and second timing sections, the first section generating a sequence of variably spaced pulses and the second section controlling the duration of each pulse of electrical energy.

5. An electronic fuel control device as set forth in claim 1, further comprising: said electrical circuit means including switching means for selectively providing the pulses of electrical energy to said pulse conducting means.

6. An electronic fuel control device as set forth in claim 5, further comprising: said electrical circuit means including lamp means for providing a visible indication of when electrical energy is provided to said pulse conducting means.

7. An electronic fuel control device as set forth in claim 1, further comprising: said electrical circuit means including switching means for selectively providing electrical power to an ignition circuit of the computer system.

8. An electronic fuel control device as set forth in claim 7, further comprising: said electrical circuit means including lamp means for providing a visible indication of when electrical power is provided in the ignition circuit.

9. An electronic fuel control device as set forth in claim 1, further comprising: said electric circuit means including means for preventing the output from providing a reverse polarity output.

10. An electronic fuel control device as set forth in claim 1, further comprising: said electric circuit means including means for preventing damage in the event a short occurs in the output.

11. An electronic fuel control device as set forth in claim 1, further comprising: said electrical supply means including means for detachably connecting said electrical circuit means to an electrical system carried on board the vehicle.

12. An electronic fuel control device as set forth in claim 1, further comprising: said pulse conducting means including means for detachably connecting said electrical circuit means to a terminal on a fuel injector in the fuel injecting system.

13. An electronic fuel control device adapted to control a fuel injecting system of a motor vehicle independently of a computer system carried on board the vehicle, comprising: electrical circuit means for creating an output of a series of pulses of electrical energy, said electrical circuit means including means for creating pulses of constant duration electrical energy, means for creating a sequence of variably spaced pulses such that the flow of fuel is controlled to selectively vary the ratio of fuel to air for use in an engine provided on board the vehicle, an integrated circuit having first and second timing sections, the first section generating a sequence of variably spaced pulses and the second section controlling the duration of each pulse of electrical energy, first switching means for selectively providing the pulses of electrical energy to the fuel injecting system, first lamp means for providing a visible indication of when electrical energy is provided to the fuel injecting system, second switching means for selectively providing electrical power to an ignition circuit in the computer system, second lamp means for providing a visible indication of when electrical power is provided to the ignition circuit, means for preventing the output from providing a reverse polarity output, and means for preventing damage in the event a short occurs in of the output; electrical supply means connected to said electrical circuit means for carrying electrical power into said electrical circuit means, said electrical supply means including means for detachably connecting said electrical circuit means to an electrical system carried on board the vehicle; and pulse conducting means connected to said electrical circuit means for transporting the pulses of electrical energy from said electrical circuit means to the fuel injecting system, said pulse conducting means including means for detachably connecting said electrical circuit means to a terminal on a fuel injector in the fuel injecting system.

14. A method of controlling the fuel to an engine carried on board a motor vehicle independently of a computer system carried on board the vehicle, comprising the steps of: connecting apparatus adapted to create an output of a series of pulses of electrical energy to the electrical system of the vehicle; supplying electrical power to the apparatus; and directing the output of pulses of electrical energy from the device to a fuel injecting system carried on board the vehicle and thereby activate the fuel injecting system to supply fuel to the engine for operation.

15. A method of controlling the fuel to the engine as set forth in claim 14, further comprising the steps of: controlling the series of pulses to be of constant duration and to be in a sequence of variably spaced pulses such that the flow of fuel is controlled to selectively vary the ratio of fuel to air for use in the engine.

16. A method of controlling the fuel to the engine as set forth in claim 14, further comprising the steps of: selectively providing the pulses of electrical energy to the fuel injecting system; and providing a visible indication of when electrical energy is provided to the fuel injecting system.

17. A method of controlling the fuel to the engine as set forth in claim 16, further comprising the steps of: selectively providing electrical power to an ignition circuit in the computer system; and providing a visible indication of when electrical power is provided to the ignition circuit of the computer system.

18. A method of controlling the fuel to the engine as set forth in claim 14, further comprising the step of: preventing the output from providing a reverse polarity output.

19. A method of controlling the fuel to the engine as set forth in claim 14, further comprising the steps of: preventing damage to the apparatus in the event a short occurs in the output.

* * * * *